United States Patent [19]
Renz

[11] Patent Number: 5,894,740
[45] Date of Patent: Apr. 20, 1999

[54] REFRIGERATING PLANT

[75] Inventor: Hermann Renz, Egenhausen, Germany

[73] Assignee: Bitzer Kuehlmaschinenbau GmbH, Sindelfingen, Germany

[21] Appl. No.: 08/874,607

[22] Filed: Jun. 13, 1997

[30] Foreign Application Priority Data

Mar. 1, 1997 [DE] Germany .............. 197 08 428

[51] Int. Cl.$^6$ ................................. F25B 43/02
[52] U.S. Cl. ............................. 62/468; 62/84
[58] Field of Search ................ 62/85, 468, 471, 62/473, 500, 84

[56] References Cited

U.S. PATENT DOCUMENTS

| | | |
|---|---|---|
| 1,951,915 | 3/1934 | Kagi ................................ 62/468 |
| 3,820,350 | 6/1974 | Brandin et al. . |
| 4,254,637 | 3/1981 | Brauch et al. .................. 62/468 |

FOREIGN PATENT DOCUMENTS 123 967  1/1977  Germany .

Primary Examiner—John M. Sollecito
Attorney, Agent, or Firm—Barry R. Lipsitz

[57] ABSTRACT

In order to improve a refrigerating plant comprising a refrigerant circuit, which has a main stream of refrigerant flowing through an evaporator, a compressor, a condenser and a collector one after the other, and an oil circuit for the compressor with an oil cooler such that the oil cooler can be operated as simply and reliably as possible, it is suggested that the oil cooler be adapted to be cooled by a branch stream of liquid refrigerant from the refrigerant circuit, that the branch stream circulate in a branch circuit on the pressure side, that the branch circuit branch off from a collector arranged downstream of the condenser in the main stream of the refrigerant circuit, convey liquid refrigerant to the oil cooler and then supply the refrigerant evaporated at least partially in the oil cooler to the main stream of refrigerant on the pressure side upstream of the condenser and that a pumping device driven by the main stream of refrigerant flowing from the compressor to the condenser pump the branch stream of refrigerant through the branch circuit.

10 Claims, 2 Drawing Sheets

REFRIGERATING PLANT

The invention relates to a refrigerating plant, comprising a refrigerant circuit, which has a main stream of the refrigerant flowing through an evaporator for evaporating liquid refrigerant subject to pressure by way of expansion and heat absorption, a compressor for compressing the expanded refrigerant coming from the evaporator, a condenser arranged on the pressure side of the compressor for condensing the refrigerant subject to pressure, a collector for the liquid refrigerant subject to pressure prior to supply thereof to the evaporator one after the other, and an oil circuit for the compressor with an oil cooler associated with the oil circuit.

Refrigerating plants of this type are known from the state of the art. In this respect, the oil cooler is acted upon primarily with water, air or also with refrigerant in accordance with the gravity circulation system.

These known refrigerating plants have the disadvantage that they are severely limited with regard to their use. The provision of water cooling for the oil cooler depends on the availability of water as a cooling medium. Air cooling of the oil cooler requires considerable resources, in particular due to the additional blower, including air circulation, temperature regulation, constructional size and adaptation to the installation conditions. The thermosiphon system for cooling the oil cooler with refrigerant based on the effect of gravity circulation has the disadvantage that a special oil cooler is installed relative to the collector for the liquid refrigerant and, in particular, the collector must be arranged at a defined height above the oil cooler to overcome the losses in pressure in the thermosiphon system and so this can be realized only with particularly favorable installation conditions.

The object underlying the invention is therefore to improve a refrigerating plant of the generic type such that the oil cooler can be operated as simply and reliably as possible without any constructional limitations for the plant.

This object is accomplished in accordance with the invention, in a refrigerating plant of the type described at the outset, in that the oil cooler can be cooled by a branch stream of liquid refrigerant from the refrigerant circuit, that the branch stream circulates in a branch circuit on the pressure side, that the branch circuit branches off from a collector arranged downstream of the condenser in the main stream of the refrigerant circuit, conveys liquid refrigerant from this collector to the oil cooler and then supplies the refrigerant evaporated at least partially in the oil cooler to the main stream of refrigerant on the pressure side upstream of the condenser and that a pumping device driven by the main stream of refrigerant flowing from the compressor to the condenser pumps the branch stream of refrigerant through the branch circuit.

The advantage of the inventive solution is to be seen in the fact that this may be integrated into existing and prefabricatable solutions simply and, above all, inexpensively without any constructional restrictions. The inventive solution makes use, first of all, of the fact that the refrigerant in the branch stream, which is at least partially evaporated, is supplied to the main stream of refrigerant on the pressure side upstream of the condenser so that the condenser is used at the same time not only to condense the main stream of refrigerant coming from the compressor but, at the same time, to absorb the heat transferred from the oil cooler to the branch stream, as well.

In addition, the flow of the main stream of refrigerant coming from the compressor is utilized in the inventive solution to drive a pumping device which, for its part, pumps the branch stream of refrigerant through the branch circuit so that the necessity of an additional drive or the supply of auxiliary energy for this pumping device can be dispensed with and thus the inventive refrigerating plant can be operated particularly reliably in continuous operation.

Purely in principle, it would be possible to design the branch circuit such that not the entire branch stream of refrigerant which passes through the oil cooler is supplied to the main stream on the pressure side downstream of the oil cooler and upstream of the condenser but, for example,— insofar as the branch stream still comprises, for example, liquid refrigerant—this is partially supplied to the main stream downstream of the condenser. Apart from the fact that this solution is more complicated, it has the disadvantage that with it heat is introduced into the main stream downstream of the condenser and this possibly leads to reductions in performance. For this reason, it is advantageously provided for the branch circuit to supply the entire branch stream of refrigerant which passes through the oil cooler to the main stream on the pressure side downstream of the oil cooler. This has, in particular, the additional advantage that as a result of the partially liquid refrigerant which is supplied to the main stream from the branch circuit the overheating in the main stream can be reduced and thus the amount of convective heat transfer is decreased for the condensation and thus the transfer of heat is improved.

In order to obtain a defined cooling effect in the oil cooler and transfer as little heat as possible to the main stream on the pressure side, it is preferably provided for the branch stream of refrigerant through the branch circuit to be controllable with a valve.

The valve can preferably be controlled by a control means which detects a pressure gas temperature and/or a temperature of the oil in the oil circuit.

With respect to the design of the collector arranged in the branch circuit and in the refrigerant circuit, no further details have been given. In principle, this collector could be identical to the main collector provided in any case in the refrigerant circuit. Since this main collector is, however, intended to have a relatively large capacity for condensed refrigerant, this has the disadvantage that the choice of location for the collector is not freely optional in this case.

For this reason, a particularly advantageous embodiment provides for the collector to be connected upstream or downstream of the main collector. This has the advantage that the collector can be dimensioned for a relatively small volume, for example in the order of magnitude of a few liters, and thus the possibility exists of arranging this collector at the most suitable location for the assembly of the plant and, in particular, its installation in given spatial conditions. For example, the collector can, in this case, be arranged in addition such that a liquid column between this and the oil cooler creates an additional differential pressure which promotes the flow through the branch circuit and aids the differential pressure generated by the pumping device.

With respect to the design of the pumping device itself, no further details have been given in conjunction with the preceding explanations concerning the individual embodiments. It would, for example, be possible to design the pumping device in a similar manner to a turbocharger in a motor vehicle, wherein, in this case, the main stream would drive a turbine which, for its part, then drives a rotary pump.

A solution is, however, much simpler, in which the pumping device is an injector which thus does not operate with rotating parts but merely with an injector nozzle arranged in a Venturi tube so that, apart from the lower costs, this pumping device has the advantage that it operates over a long period of time maintenance-free.

With respect to the compressor used in conjunction with the inventive refrigerating plant, no further details have likewise been given thus far. In principle, any type of compressor which has an oil circuit can be suitably utilized. These compressors are preferably displacement-type compressors, for example, screw compressors.

The oil circuit of the compressor is expediently designed such that it comprises an oil separator which is arranged in the main stream downstream of the compressor and from which the oil then flows to the oil cooler. Such a construction is thus in a position to recover again the predominant portion of the oil passed to the main stream during compression and to supply this to the compressor.

The refrigerant supplied to the main stream from the branch circuit could be fed into the main stream upstream of the oil separator. However, in order to relieve the oil separator of an additional mass flow and also not to impede the oil separation with this mass flow of the branch circuit which comprises partially liquid refrigerant, it is advantageously provided for the branch stream to be fed into the main stream downstream of the oil separator.

In principle, the pumping device can be arranged completely independently of the oil separator.

For reasons of particularly low constructional resources, it has, however, proven to be advantageous when the pumping device is arranged in the main stream to follow the oil separator and thus has the main stream of refrigerant flowing through it, which has already been largely freed from oil.

A particularly compact and, at the same time, flexible type of construction for the inventive solution results when the pumping device is held on the oil separator so that the two parts can be produced and then also installed as a unit. In particular, the line leading to the pumping device can, with this concept, also be integrated into this structural unit.

With respect to the oil cooler itself, no further details have been given in conjunction with the embodiments described thus far. The oil cooler itself can, for example, be designed as a heat exchanger which forms its own structural unit arranged in the oil circuit. Alternatively thereto, it is, however, also conceivable to integrate the oil cooler into an oil sump of the compressor and, for example, to convey the branch stream through a cooling coil arranged in the oil sump.

Additional features and advantages of the invention are the subject matter of the following description as well as the drawings of two embodiments.

In the drawings

Figure 1:
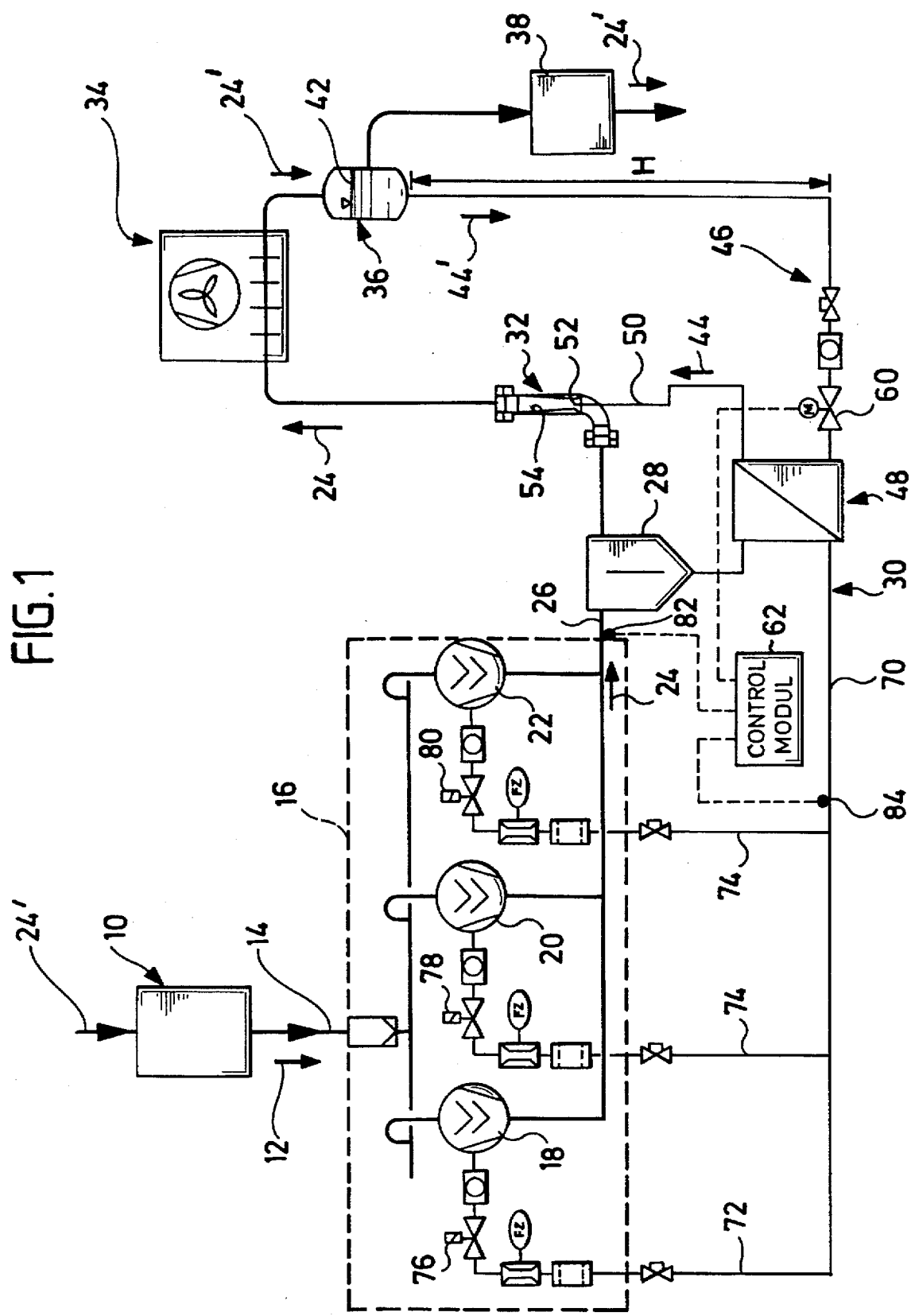
FIG. 1 shows a schematic illustration of a first embodiment.

One embodiment of an inventive refrigerating plant illustrated in FIG. 1 comprises an evaporator 10, in which liquid refrigerant subject to pressure is evaporated by means of expansion thereof.

Following the evaporator 10, an expanded low pressure main stream 12 of refrigerant flows through a supply line 14 to a compressor which is designated as a whole as 16 and can have a single compressor unit or, as illustrated in FIG. 1, for example, three screw compressors connected in parallel.

A high pressure main stream 24 on the pressure side then exits from the compressor 16 through an exit line 26 and following the compressor 16 flows through an oil separator 28 which serves to separate oil carried along from the compressor 16 in the main stream 24 on the pressure side in order to be able to return this oil again to the compressor 16 via an oil circuit following on from the oil separator 28 and designated as a whole as 30.

Following the oil separator 28, the main stream 24 flows through an injector 32 and subsequently enters a condenser which is designated as a whole as 34 and condenses the gaseous main stream 24 of refrigerant on the pressure side so that following the condenser 34 the main stream 24' on the pressure side passes through a branch collector 36 in the form of condensed refrigerant and subsequently enters the actual main collector 38 for the condensed refrigerant, proceeding from which the refrigerant is returned again to the compressor in the form of the liquid main stream 24' so that, altogether, a refrigerant circuit results.

The collector 36, which has the main stream 24' of condensed refrigerant flowing through it, serves to collect a small amount 42 of the condensed refrigerant and to branch off a branch stream 441 of condensed refrigerant from the main stream 24', wherein the branch stream 44' is conveyed in a branch circuit 46 which, proceeding from the collector 36, leads to an oil cooler 48, in which the condensed refrigerant of the branch stream 44' is evaporated at least partially or completely and then exits in the form of the branch stream 44 which can be supplied to a nozzle 52 of the injector 32 via a line 50.

The injector 32 has, in addition, a Venturi tube 54 for the main stream 24, in which the injector nozzle 52 is seated so as to be centered, so that the main stream 24 flowing through the injector 32 develops a pumping effect on the branch stream 44 exiting from the injector nozzle 52 on account of the underpressure resulting in the Venturi tube 54 and thus serves to build up a differential pressure in the branch circuit 46 which compensates the sum of all the pressure losses occurring therein.

The differential pressure generated by the injector 32 can, in addition, be increased by the collector being arranged at a height H above the oil cooler 48 and thus a liquid column formed between the collector 36 and the oil cooler 48 generating an additional differential pressure which is added to the differential pressure generated by the injector 32 so that the sum of these differential pressures is greater than the pressure losses in the branch circuit 46, for example due to the pipes, the oil cooler 48, necessary valves and the condenser.

A valve 60 is, in particular, provided in the branch circuit 46 and this can be controlled by a control means 62 which regulates a temperature of the oil and/or pressure gas in the oil circuit 30.

The oil cooler 48 is preferably arranged in the oil circuit 30 to follow directly on from the oil separator 28 and an output line 70 of the oil cooler 48, via which cooled oil exits, is connected to oil supply lines 72, 74 and 76 for the individual screw compressors 18, 20 and 22, via which the oil is then returned, where required controlled by respective valves 76, 78 and 80.

The control means 62 preferably measures a temperature, on the one hand, of the main stream 24 on the pressure side exiting from the compressor 16 with a temperature sensor 82 and, on the other hand, a temperature of the cooled oil in the oil circuit 30, which exits from the oil cooler 48 in the output line 70.

Figure 2:
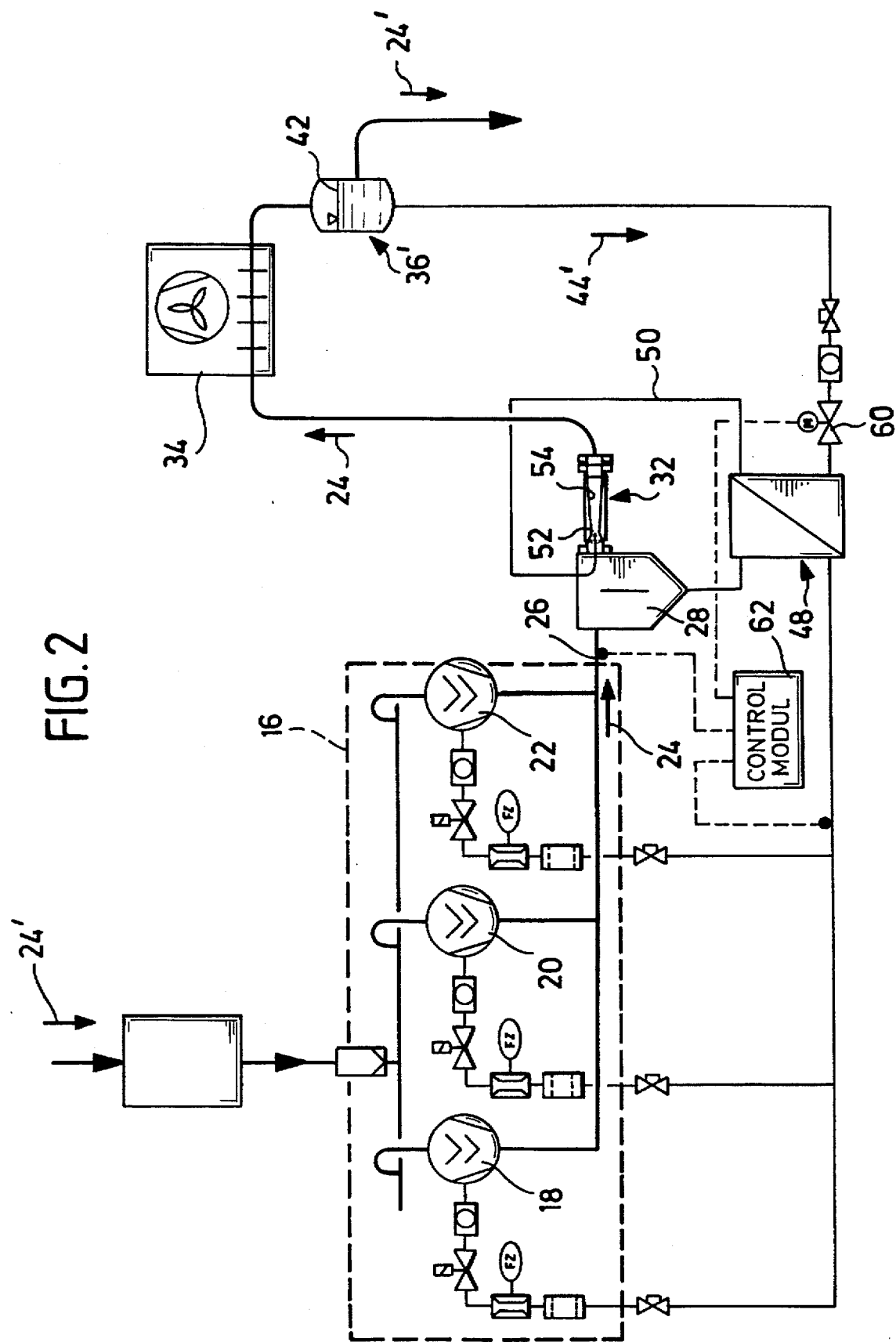
FIG. 2 shows a schematic illustration of a second embodiment.

In a second embodiment of an inventive refrigerating plant, illustrated in FIG. 2, those parts which are identical to those of the first embodiment are given the same reference numerals and so reference can be made to the explanations concerning the first embodiment with respect to their description.

In contrast to the first embodiment, the injector 32 in the second embodiment is flanged directly onto the oil separator 28, for example at a pressure-gas outlet thereof, and thus forms a uniform structural unit with this separator. This means, for example, that the pipe 50 coming from the oil cooler 48 and leading to the injector nozzle 52 can also be designed as a permanent component part of the oil separator 28 and, for example, be integrated into it. This means that a more compact and more inexpensive type of construction is possible for the inventive refrigerating plant.

In addition, the collector 36' is preferably designed such that it replaces the collector 38 in the refrigerant circuit at the same time and thus only one collector 36' is required. In this case, since the differential pressure generated by the injector 32 is sufficient, the additional assistance by the differential pressure generated between the collector 36 and the oil cooler 48 from the liquid side can essentially be dispensed with and so this solution is not subject to any constructional restrictions at all with respect to the arrangement of the collector 36' and thus the differential pressure required for maintaining the branch stream 44', 44 in the branch circuit 46 is generated exclusively by the injector 32.

What is claimed is:

1. Refrigerating plant comprising a refrigerant circuit, said refrigerant circuit having a main stream of refrigerant flowing through an evaporator for evaporating liquid refrigerant by expansion and heat absorption, a compressor for compressing an expanded low pressure refrigerant coming from the evaporator to a high pressure, a condenser arranged on the high pressure side of the compressor for condensing the refrigerant subject to said high pressure and a main collector for the liquid refrigerant subject to said high pressure prior to supply thereof to the evaporator one after the other, and an oil circuit for the compressor with an oil cooler arranged in the oil circuit, said oil cooler being adapted to be cooled by a branch stream of liquid refrigerant from the refrigerant circuit, said branch stream circulating in a branch circuit on the high pressure side, said branch circuit branching off from a branch collector arranged downstream of the condenser in the main stream of the refrigerant circuit and conveying liquid refrigerant to the oil cooler and then supplying the refrigerant evaporated at least partially in the oil cooler to the main stream of refrigerant on the high pressure side upstream of the condenser and a pumping device driven by the main stream of refrigerant flowing from the compressor to the condenser for pumping the branch stream of refrigerant through the branch circuit.

2. Refrigerating plant as defined in claim 1, wherein said branch circuit supplies the entire branch stream of refrigerant passing through the oil cooler to the main stream on the pressure side.

3. Refrigerating plant as defined in claim 1, wherein said branch stream of refrigerant through the branch circuit is adapted to be controlled with a valve.

4. Refrigerating plant as defined in claim 1, wherein said branch collector is connected upstream of the main collector.

5. Refrigerating plant as defined in claim 1, wherein said pumping device is an injector.

6. Refrigerating plant as defined in claim 1, wherein said oil circuit of the compressor comprises an oil separator arranged in the main stream downstream of the compressor, the oil flowing from said oil separator to the oil cooler.

7. Refrigerating plant as defined in claim 6, wherein said branch circuit opens into the main stream downstream of the oil separator.

8. Refrigerating plant as defined in claim 6, wherein said pumping device is arranged in the main stream to follow the oil separator.

9. Refrigerating plant as defined in claim 8, wherein said pumping device is held on the oil separator.

10. Refrigerating plant as defined in claim 1, wherein said main collector and said branch collector comprise a single unit.

* * * * *